United States Patent

[11] 3,613,936

[72] Inventors Arthur E. Kaiser
17200 Brookside Blvd. N.E., Seattle, Wash. 98155;
Jefferson M. Fluke, 1811 10th W., Kirkland, Wash. 98033
[21] Appl. No. 30,077
[22] Filed Apr. 20, 1970
[45] Patented Oct. 19, 1971

[54] ADJUSTABLE DIAMETER PIPE CLOSURE PLUG
8 Claims, 5 Drawing Figs.
[52] U.S. Cl. .................................................. 220/24.5, 138/89
[51] Int. Cl. ................................................. B65d 39/12
[50] Field of Search ...................................... 220/24.5; 138/89

[56] References Cited
UNITED STATES PATENTS

| | | | |
|---|---|---|---|
| 3,291,156 | 12/1966 | Corsano | 138/89 |
| 3,467,271 | 9/1969 | Kaiser et al. | 220/24.5 |
| 3,494,504 | 2/1970 | Jackson | 220/24.5 |

FOREIGN PATENTS

| | | | |
|---|---|---|---|
| 6,500,941 | 7/1965 | Netherlands | 138/89 |

*Primary Examiner*—George E. Lowrance
*Attorney*—Graybeal, Cole and Barnard

ABSTRACT: An elastomeric sealing ring is supported on a frustoconical support surface which surrounds a radial closure wall. A sealing-ring-positioning member is located axially endwise of the small diameter end of the sealing ring support. It includes an axial extension which concentrically surrounds the small-diameter end portion of the sealing ring support and has a generally radial end wall in contact with the sealing ring. A bolt extends axially between the radial closure wall and the sealing-ring-positioning member. A nut on the bolt is tightened to cause the sealing-ring-positioning member to move the elastomeric sealing ring up the frustoconical surface, to change its effective diameter. The large diameter end of the frustoconical support is faced towards pressure in the pipe so that pressure on the radial closure wall will make the sealing ring tend to roll further up on the frustoconical support and engage the pipe more tightly.

PATENTED OCT 19 1971
3,613,936
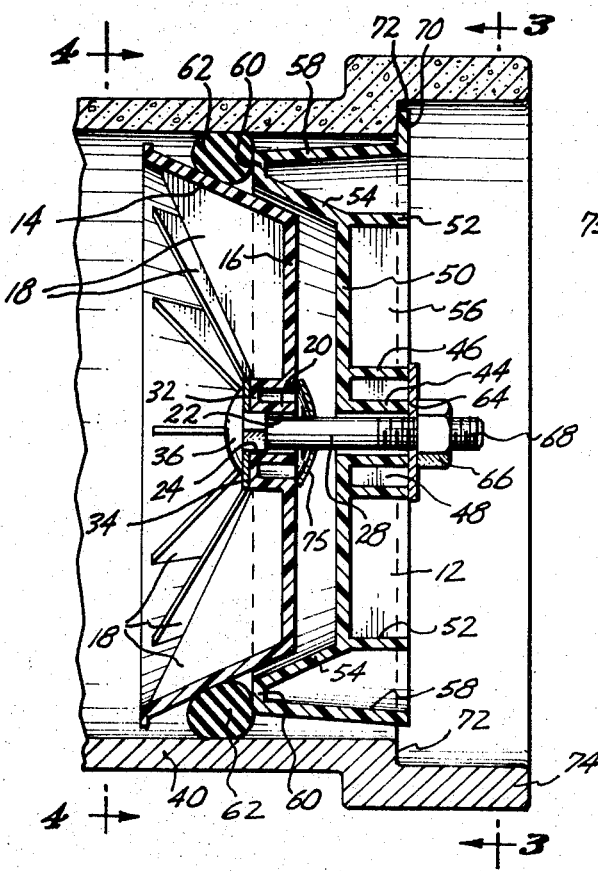
Fig.1.
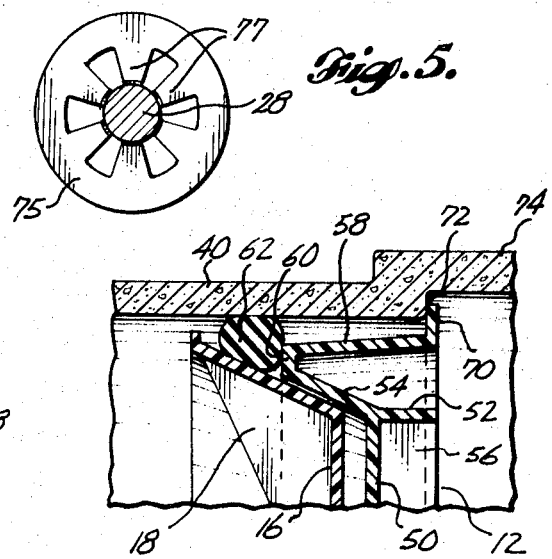
Fig.5.
Fig.2.
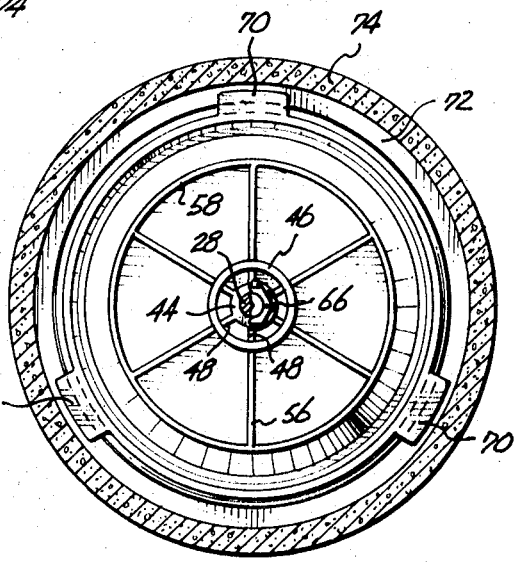
Fig.3.
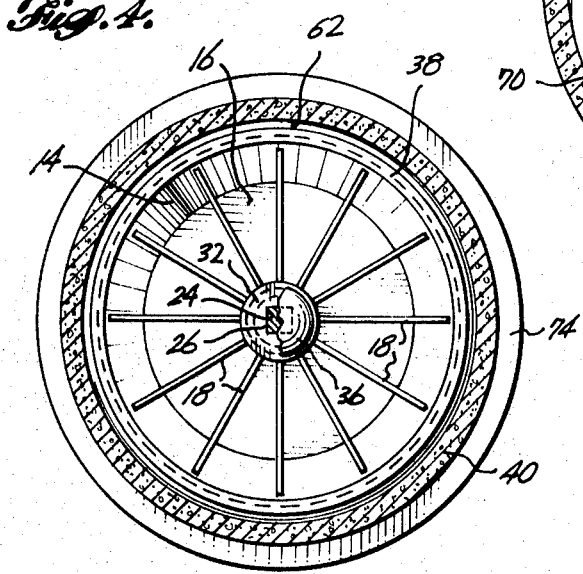
Fig.4.
INVENTORS
ARTHUR E. KAISER
JEFFERSON M. FLUKE
BY Graybeal, Cole & Barnard
ATTORNEYS

3,613,936

ADJUSTABLE DIAMETER PIPE CLOSURE PLUG

BACKGROUND OF THE INVENTION

1. Field of the Invention

The present invention relates to closure plugs for temporarily blocking a passage, such as in a sewer pipe, and more particularly to a closure plug which is adjustable in initial diameter so as to accommodate the variances in diameter incurred with respect to conventional sewage pipe.

2. Description of the Prior Art

Whenever a building sewer pipeline is installed, it is necessary that the pipeline be field tested to ensure that the pipeline will meet the required building specifications. In order to test the pipeline, it is necessary to seal an open end thereof so that the necessary fluid pressure for the test may be established in the pipeline.

U.S. Pat. No. 3,467,271, granted Sept. 16, 1969 to Arthur E. Kaiser and Jefferson M. Fluke, relates to a pipe closure plug for this purpose. Such patent discloses a single-diameter pipe closure plug which operates in similar fashion to the pipe closure plug assembly of the present invention. It comprises a frustoconical sealing ring support, the large diameter end of which is directed towards the pressure in the pipe. The elastomeric sealing ring fills the radial space between the frustoconical support and a surrounding cylindrical surface portion of the pipe. This ring is compressed somewhat when the pipe closure plug is inserted into the plug. Fluid pressure on the body of the plug makes the sealing ring tend to roll up its frustoconical support. The ring becomes wedged tightly between the plug and pipe surfaces it contacts and prevents the plug from being forced out from the pipe by the fluid pressure. The seal also seals against fluid leakage through the annular zone between the plug body and the pipe.

A split-seat-type pipe closure plug is shown by U. S. Pat. No. 3,291,156, granted Dec. 13, 1966, to Alfred Corsano. This patent primarily relates to a split seat plug in which the two plug parts have radial walls with a design in flexibility so that they will flex under a predetermined load and automatically limit the force exerted on the pipe.

U.S. Pat. No. 3,494,504, granted Feb. 10, 1970, to Joseph C. Jackson relates to an adjustable pipe closure plug assembly which in appearance closely resembles our plug assembly but which differs therefrom in several material respects. Our closure plug assembly is believed to constitute an improvement on the assembly of this patent.

SUMMARY OF THE INVENTION

Sewer pipes are made in several sizes. Hence, it is necessary to make a closure plug in several sizes if one is to be available for each size of pipe. There is also a sizing problem with each size of pipe. This is because little care is taken during the manufacture of sewer pipe to obtain uniformity in inside diameter, i.e. close tolerances are not sought in sewer pipe manufacturing.

The pipe closure plug of the present invention is characterized by a construction which permits an adjustment of the initial diameter of the elastomeric sealing ring, so that the plug can be adjusted to accommodate manufacturing irregularities.

The pipe closure plug disclosed by U. S. Pat. No. 3,467,271 has a generally radial retaining lip at the small diameter end of the frustoconical support surface for the elastomeric sealing ring. In the pipe closure plug assembly of the present invention this lip is replaced by an axially movable abutment. When moved towards the larger diameter end of the sealing ring support surface the abutment rolls the sealing ring up the support surface and in this manner changes its initial diameter. Prior to use the abutment is appropriately positioned to make the diameter of the sealing ring proper for the particular piece of pipe in which the closure plug assembly is to be installed. In use the fluid pressure acting on a radial closure wall spanning the space inwardly of the sealing ring support surface causes the same rolling, wedging, binding and sealing action of the elastomeric sealing ring that occurs in the pipe closure plug assembly disclosed by the aforementioned U.S. Pat. No. 3,467,271.

In contrast to the closure plug assembly disclosed in the U.S. U. Pat. No. 3,494,504, the elastomeric ring of our plug is positioned by an extension made up of two frustoconical walls interconnected by a radially short radial wall. Owing to this construction, tightening of the nut and bolt assembly used for securing the two parts of the plug assembly together causes essentially no distortion of the resilient ring contacting surface. Also, it is possible to make this surface radially wider than the end surface of the patent and at the same time be dealing with thinner wall parts, so that the cost of manufacture is relatively low.

The present invention also relates to certain specific constructional features of the pipe closure plug, which features are described below in the reference to the drawing.

BRIEF DESCRIPTION OF THE DRAWINGS

FIG. 1 is a fragmentary axial sectional view of the bell end of a piece of conventional bell-spigot sewer pipe, showing an embodiment of the closure plug of the present invention installed, such closure plug assembly also being shown in axial section, except for its central adjustment and securement bolt which is shown in side elevation;

FIG. 2 is a fragmentary axial sectional view similar to the upper portion only of FIG. 1, showing the sealing ring diameter changing abutment positioned to hold the sealing ring in a larger initial diameter;

FIG. 3 is a cross-sectional view taken through the pipe, substantially along line 3—3 of FIG. 1;

FIG. 4 is a cross-sectional view taken through the pipe, substantially along line 4—4 of FIG. 1; and FIG. 5 is a fragmented cross-sectional view taken substantially along line 5—5 of FIG. 1, showing the spring washer in elevation.

DESCRIPTION OF THE PREFERRED EMBODIMENT

The illustrated embodiment comprises two all-plastic body parts 10, 12. Part 12 includes a frustoconical shaped sealing ring seat or support 14. A radial wall 16 spans the space between the small diameter end of the support 14. A plurality of radial gussets 18 are interconnected between wall 16 and ring support 14. These gussets 18 lend rigidity to the member 10 and brace against deformation of the ring support 14 during pressure loading on the plug assembly.

An inner ring 20 defines a central bolt-receiving opening 22. The bolt head end of the opening 22 includes a square region 24 which receives the square section 26 of a carriage bolt 28 and holds it against rotation within the opening 22. An outer ring 30 concentrically surrounds inner ring 20 spaced relationship thereto. A radial wall 32 is interconnected between the two rings 20,30 on the gusset side of member 10. A resilient sealing washer 34 rests against wall 32 and the flat inner surface of the bolt head 36 rests against the washer 34.

Wall 16 joins the opposite or low pressure end of the ring 30. Preferably, the low pressure end of ring 20 terminates in the plane of the low pressure side of wall 16.

The large diameter end 38 of member 10 is smaller in diameter than the inside diameter of the pipe 40. Pipe 40 is of a tile, cement, composition or plastic construction which, as previously stated, varies to some extent in internal diameter from one piece or length of pipe to the next. With respect to each size of pipe 40 the diameter of member 10 at end 38 is made to always be slightly smaller in diameter than the smallest inside diameter which is expected to be incurred with the pipe 40. This is so the member 10 can always be inserted into the pipe 40.

The ring-positioning member 12 includes a central hub portion which is similar in construction to the hub portion of member 10. It comprises inner and outer concentric walls 44,46 which are interconnected by radial gussets 48. The inner ends of the rings 44,46 are interconnected by a radial wall 50 which extends radially outwardly to a point of intersection and connection with a third ring 52, concentrically related with the rings 44, 46, and a frustoconical wall or flange 54. Wall 54 enlarges in diameter as it extends away from radial wall 50. As best shown by FIG. 3, a plurality of radial webs 56 extend between ring 46 and ring 52, and are attached to wall 50.

An outer annular main wall 58 concentrically surrounds, and is spaced radially outwardly from, the ring 52 and the wall 54. A radially short, annular ring 60 is interconnected between the inner ends of the walls 54, 58. This annular radial wall 60 constitutes a movable abutment for initially positioning the elastomeric sealing ring (or O-ring) 62 on its support 14, and in that manner establishing the initial diameter of the ring 62.

A second washer bears against the outer ends of the concentric rings 44, 46, and against the radial webs 48. An adjustment nut 66 rides the threaded end 68 of the bolt 28 and bears against the washer 64. A plurality of radial ears 70 project radially outwardly from locations at the outer end of annular wall 58. These ears 70 are provided to contact the shoulder 72 at the base of the pipes bell 74.

Prior to use the sealing ring 62 is placed on its support 14. The bolt 28 is installed and a spring washer 75 is applied. The washer 75 is forced towards wall 16. This causes the spring tires 77 to bend and prevent return travel. Washer 75 is used to maintain a sealing pressure on washer 34. Next the members 10 and 12 are secured together by the bolt 28 and the adjustment nut 66. With the two parts 10, 12 only loosely connected the assembly is inserted into the pipe 40, through the bell end 74 thereof. The adjustment nut 66 is then tightened to force the abutment 60 axially toward the large diameter end 38 of the support 14. As it moves, the abutment 60 rolls the sealing ring 62 up the sloped support 14, increasing its initial diameter end causing it to be squeezed or wedged between the outer surface's support 14 and the inner surface of pipe 40. Tightening rotation of nut 66 is stopped whenever the sealing ring 62 is sufficiently expanded to hold the plug assembly in the pipe.

When the pipe 40 is pressurized and pressure fluid acting on the pressure sides of support 14 and wall 16 tend to shove the assembly axially out the pipe 40. As member 10 starts to move axially to the right as pictured in FIGS. 1 and 2, the support 14 exerts a force on the sealing ring 62 tending to rotate it further up the inclined support surface and into a tighter wedging engagement between the pipe 40 and the support 14. This action is illustrated and described in the aforementioned U.S. Pat. No. 3,467,271. Hence, rather than repeat the sequence of views included in U.S. Pat. No. 3,467,271 to show the change in position of the sealing ring 62, the contents of U.S. Pat. No. 3,467,271 are hereby incorporated herein by this specific reference.

As an important part of the invention, the fluid pressure causes some axial movement of the plug member. This results in a relieving of the tension in the tie bolt 28. However, the spring washer 75 maintains the pull on bolt 28 causing it to compress washer 34 for maintaining a fluid tight seal.

Although the invention has been described in its preferred form, it is understood that various modifications and changes in the structural detail shown and discussed may be made without departing from the principles of the invention.

What is claimed is:

1. An adjustable diameter closure plug assembly for blocking flow through or out from a tubular conduit, comprising:
    a plug member having a frustoconical, peripheral, sealing ring support, a large diameter end which is smaller in diameter than the internal diameter of the conduit, a small-diameter end, and transverse closure wall means;
    an elastomeric sealing ring surrounding and engaging said sealing ring support;
    a sealing-ring-positioning member located axially outwardly of the small diameter end of said sealing ring support, said member including an axial extension which extends axially inwardly and in use concentrically surrounds the small diameter end portion of said sealing ring support, said extension comprising radially inner and outer annular walls connected together at their axial inner ends, and diverging apart as they extend axially outwardly from said inner ends, said extension making contact with said sealing ring at its said axial inner end, and transverse support means connected to said axial extension; and
    an adjustable tie means interconnected between said transverse closure wall means of said plug member and said transverse support means of said sealing-ring-positioning member, and operable for changing the position of the radial end surface of said ring-positioning member axially between the two ends of said sealing ring support, to change the effective diameter of said sealing ring.

2. The assembly of claim 1, wherein a radially short radial wall spans between and interconnects the axial inner ends of said annular extension walls, and said wall abuts the elastomeric sealing ring.

3. The assembly of claim 1, wherein the transverse support means of said sealing-ring-positioning member is connected to the inner annular wall of said extension, and wherein said inner annular wall is a frustoconical wall which increases in diameter as it extends axially from its connection with said transverse support to its connection with said out annular wall.

4. The assembly of claim 3, wherein said outer annular wall is also a frustoconical wall, and it increases in diameter as it extends axially outwardly from its connection with the inner annular wall.

5. The assembly of claim 1, wherein said transverse support comprises at least one small diameter annular web near its center, surrounding a tie bolt opening, and a plurality of radial webs interconnected between said annular web and a radially outer portion of the sealing-ring-positioning member, and wherein said adjustable tie means comprises a nut and bolt assembly, the bolt of which extends through said opening, and one of the nut and bolt head of which is seated at least indirectly against said annular web.

6. The assembly of claim 5, wherein said closure wall means of said plug member is a generally radial wall, and wherein said plug member includes at least one annular web at its center which is connected to said wall and surrounds a tie-bolt-receiving opening, and a plurality of radial webs connected to said wall and interconnected radially between said ring support and said annular ring, to serve as support gussets.

7. An adjustable diameter closure plug assembly for blocking flow through or out from a tubular conduit, comprising:
    a plug member including a frustoconical sealing ring support, a large-diameter end which is smaller in diameter than the internal diameter of the conduit, a small diameter end, and a transverse closure wall having an axial center opening surrounded by a seal seat on the side thereof facing fluid pressure in the conduit during use;
    an elastomeric sealing ring surrounding and engaging said sealing ring support;
    a sealing-ring-positioning member located axially endwise of the small-diameter end of said sealing ring support, said member including a portion which in use concentrically surrounds the small diameter end portion of said sealing ring support and at its axial inner end makes contact with said sealing ring, and a transverse portion having an axial center opening;
    adjustable tie bolt means interconnected between said transverse closure wall of the plug member and the transverse portion of said sealing-ring-positioning member, and operable for changing the position of the radial end surface of said ring-positioning member axially between the two ends of said sealing ring support, to change the effective diameter of said sealing ring, said tie bolt means including a bolt which extends through both of said axial openings, an abutment means at each end of said bolt, at least one of which is a nut;

a sealing member between said seal seat and the abutment at the seal seat end of said bolt; and means on the side of said closure wall opposite said seal member for maintaining a pull on said bolt means, to in turn maintain a substantially tight seating of said sealing member, upon any relieve of tension in said tie bolt.

8. The assembly of claim 7, wherein said means for maintaining a pull on said tie bolt is a spring washer which surrounds said bolt and includes a ring portion which reacts against said closure wall and a plurality of times which engage the bolt.